United States Patent
Takayama et al.

(10) Patent No.: US 6,345,976 B1
(45) Date of Patent: Feb. 12, 2002

(54) INJECTION APPARATUS

(75) Inventors: Kazutoshi Takayama; Toshiyasu Koda; Yoshitoshi Yamagiwa; Yasuhiko Takeuchi; Yuji Hayashi; Mamoru Miyagawa, all of Sakaki-machi (JP)

(73) Assignee: Nissei Plastic Industrial Co., Ltd. (JP)

( * ) Notice: Subject to any disclaimer, the term of this patent is extended or adjusted under 35 U.S.C. 154(b) by 0 days.

(21) Appl. No.: 09/482,210

(22) Filed: Jan. 12, 2000

(30) Foreign Application Priority Data

Jan. 18, 1999 (JP) .......................................... 11-009313

(51) Int. Cl.⁷ ............................................. B29C 45/48
(52) U.S. Cl. .......................... 425/205; 366/78; 366/89; 425/207; 425/208; 425/542
(58) Field of Search ................................ 425/205, 207, 425/208, 542; 366/78, 89

(56) References Cited

U.S. PATENT DOCUMENTS

| | | | | |
|---|---|---|---|---|
| 3,888,393 A | * | 6/1975 | Drori | 425/207 |
| 4,966,539 A | * | 10/1990 | Penn | 425/208 |
| 5,002,717 A | * | 3/1991 | Taniguchi | 425/208 |

FOREIGN PATENT DOCUMENTS

| | | |
|---|---|---|
| JP | B617048 | 3/1994 |
| JP | 2586988 | 12/1996 |
| JP | 9-314603 | 12/1997 |

\* cited by examiner

*Primary Examiner*—Tim Heitbrink
(74) *Attorney, Agent, or Firm*—Ostrolenk, Faber, Gerb & Soffen, LLP

(57) ABSTRACT

There is provided an injection apparatus comprised of a heating cylinder which is closed by a front end member having a nozzle. The apparatus is further comprised of a plasticating screw in the heating cylinder in a freely rotating and reciprocating manner, and a plunger connected to the front end of the screw. The plunger has a conical front end in which flow channels are formed. The front end member has a measuring chamber formed therein at an internal central location thereof. The measuring chamber has a predetermined length and an internal diameter which is reduced by 8 to 15% with respect to an internal diameter of the heating cylinder. The diameter of the injection plunger is set almost equal to the diameter of the measuring chamber, whereby the injection plunger is inserted into the measuring chamber in a freely reciprocating manner. A gap is formed on the external peripheral surface of the plunger due to the difference between the heating cylinder internal diameter and the plunger diameter, and the gap functions as a plastication-accelerating block. The block is formed so as to have a distance longer than an injection stroke, whereby uniform plastication is achieved and uneven temperature in the material is eliminated. Further, the plunger advance blocks the gap, which leads to uniform density and precise measurement of the material.

2 Claims, 2 Drawing Sheets

INJECTION APPARATUS

BACKGROUND OF THE INVENTION

1. Field of the Invention

The present invention relates to an injection apparatus for use in molding of resin materials, metallic materials, etc., which has a plasticating screw in a heating cylinder, and dispenses with a valve.

2. Detailed Description of the Prior Art

Most of in-line screw type injection apparatuses for use in molding of ordinary resin are provided with a ring valve for preventing a back flow of the measured resin material, at a front end of a screw of the injection apparatus.

After plastication (melting and kneading) by means of the screw, the resin measured and stored in a front portion of a heating cylinder is compressed due to injection advance of the screw, to thereby generate resin pressure. Then, the ring valve is moved backward due to the resin pressure, whereby the front end of the screw is closed. Therefore, the operation of the ring valve is rendered unstable, and the quantity of leakage of the resin is unstable at every injection. Further, a measured quantity of the resin can have an error at every measurement, which adversely affects the accuracy of molded items.

Further, in the conventional injection apparatus, the plasticated resin passes through grooves formed in the screw front end within the ring valve to be stored (measured) in the front portion of the heating cylinder. Therefore, heating from the heating cylinder can be interrupted by the ring valve. Still further, after passing through the ring valve, the resin flows along the front end surface of the screw to a front central portion of the heating cylinder, where external heating is most difficult to reach. This flow of the resin coupled with poor thermal conductivity of the resin per se can pose a problem of temperature unevenness in the measured resin.

To cope with the above-mentioned problems, a number of injection apparatuses which dispense with the ring valve have been developed. However, none of them can overcome both the problems of the degraded measuring accuracy and poor temperature control.

SUMMARY OF THE INVENTION

It is therefor an object of the present invention to provide an injection apparatus which dispenses with a valve, and is capable of eliminating uneven measurement of a plasticated molding material, such as a resin material and a metallic material, and temperature unevenness in the material, to thereby always carry out injection molding in a stable manner, only by changing the structures of front ends of a conventional heating cylinder and a conventional screw, respectively.

To attain the aforesaid object, the present invention provides an injection apparatus comprising a heating cylinder having a front end and being provided with a band heater surrounding the same, a front end member arranged at the front end of the heating cylinder, and having a nozzle, a plasticating screw arranged in the heating cylinder in a freely rotating and reciprocating manner, and an injecting plunger connected to the screw in one body and having a conical front end, wherein the front end member has a measuring chamber formed therein at an internal central location thereof, the measuring chamber having a predetermined length, an internal diameter of which is reduced by 8 to 15% with respect to an internal diameter of the heating cylinder, the plunger having a diameter almost equal to the internal diameter of the measuring chamber, thereby being inserted into the measuring chamber in a freely reciprocating manner, a difference between the internal diameter of the heating cylinder and the diameter of the plunger generating a gap functioning as a plastication-accelerating block, on an external peripheral surface of the plunger, the plastication-accelerating block having a distance longer than an injection stroke.

In the injection apparatus as described above, the plunger has a shaft front portion, and the conical front end and the shaft front portion of the plunger have a plurality of flow channels formed therein.

According to the injection apparatus having the construction as described above, the plastication-accelerating block is defined by the gap which is formed on the external peripheral surface of the plunger and between the measuring chamber in the front end member and the plunger. After plastication of the molding material, by virtue of the plastication-accelerating block, the molding material is heated by the heating cylinder over the distance longer than the injection stroke. As a result, temperature unevenness in the material which has been a problem in the conventional injection apparatus can be eliminated.

Further, the plasticated material stored in the measuring chamber in the front end member is primarily compressed by the plunger to measure a predetermined quantity thereof. As a result, uneven measurement due to a back flow of the material can be dispensed with, and the thus measured plasticated material always has a constant density, which leads to further improved injection preciseness. Especially when molded items containing only several cubic centimeters of the injecting material (such as super-precision molded electronic parts) are produced, or when a metallic material which has its viscosity extremely decreased when melted is molded, the injection apparatus of the present invention can advantageously carry out injection under stable measurement of the material.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The present invention will now be described in detail with reference to FIGS. 1 to 4 showing an embodiment thereof.

Figure 1:
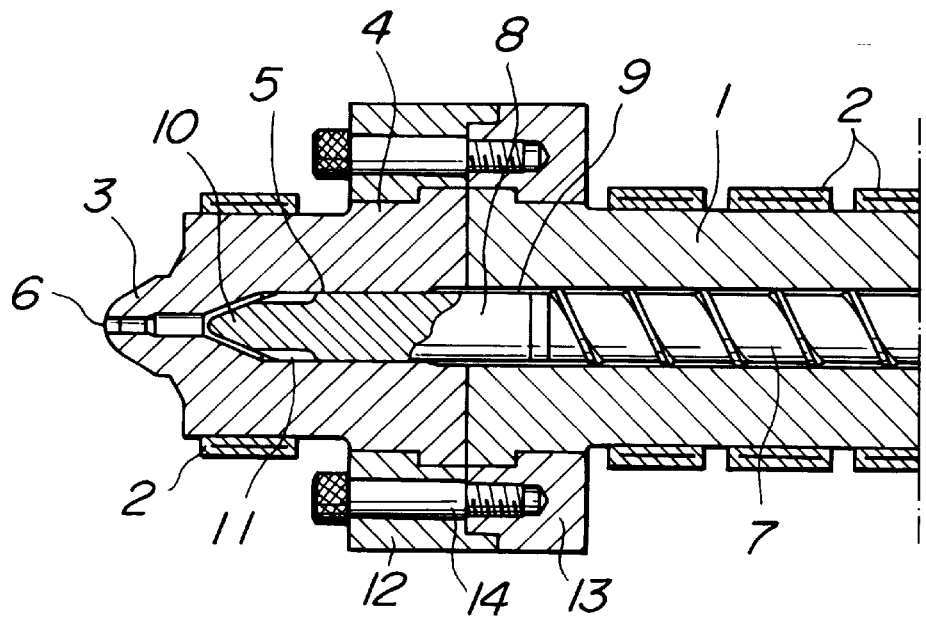
FIG. 1 is a fragmentary cross sectional view showing the construction of an essential part of an injection apparatus at the time of completion of injection, according to an embodiment of the present invention.

Referring first to FIG. 1, there is schematically illustrated an injection apparatus according to the embodiment. In the figure, reference numeral 1 designates a heating cylinder of an ordinary structure, which is provided with band heaters 2 surrounding the same, and closed by a front end member 4 having a nozzle 3. Formed in the front end member 4 at an internal central location thereof is a measuring chamber 5 which stores a plasticated molding material. The chamber 5 is of a predetermined length and a diameter which is reduced by 8 to 15% with respect to an internal diameter (D) of the heating cylinder (see FIG. 4). The measuring chamber 5 has a front end which is shaped like a funnel which communicates with a nozzle port 6 of the nozzle 3.

Figure 4:
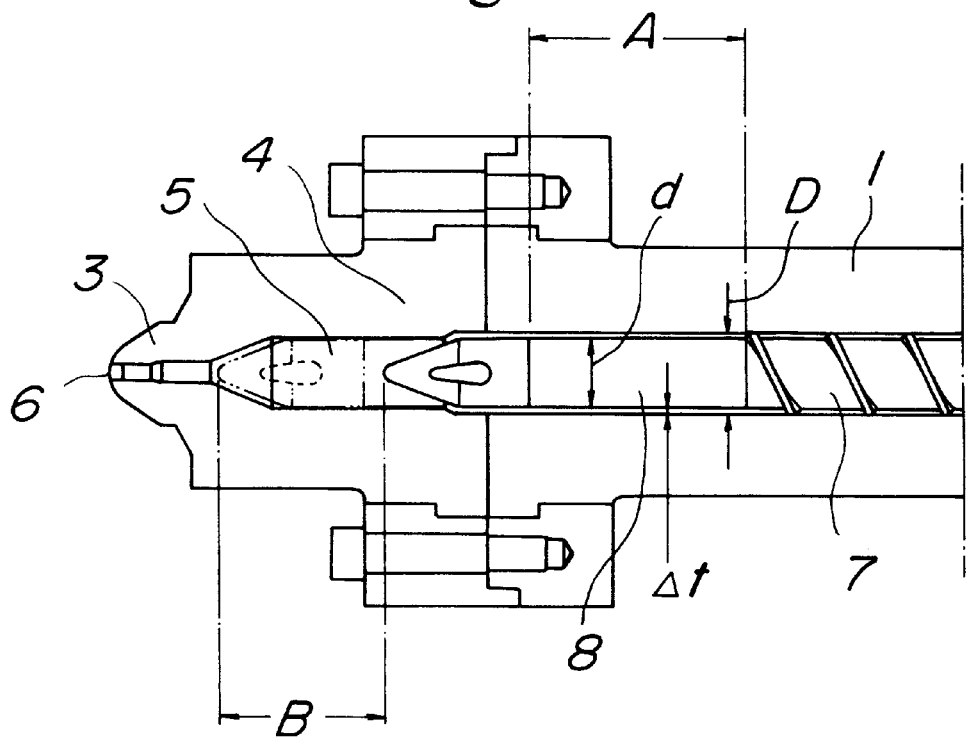
FIG. 4 is a descriptive drawing which is useful in explaining the relationship between a plastication-accelerating block and an injection stroke.

Reference numeral 7 designates a plasticating screw which is arranged in the heating cylinder 1 in a freely rotating and reciprocating manner. Connected to a front end of the screw is an injecting plunger 8 in one body. The plunger 8 has a diameter (d) almost equal to the diameter of the measuring chamber 5, as shown in FIG. 4. By this formation, the plunger 8 is inserted into the measuring chamber 5 in a freely reciprocating manner, while securing a sliding clearance with respect to the measuring chamber 5 to an extent that rarely causes a back flow of the molding material. Further, as shown in FIG. 4, a gap 9 ($\Delta t$) which is generated by a difference between the heating cylinder internal diameter (D) and the plunger diameter (d) is formed on an external peripheral surface of the plunger 8, and the thus formed gap functions as a plastication-accelerating block A which is designed to be longer than an injection stroke B.

The plunger 8 has a front end 10 which is shaped like a cone having a taper face. The conical front end 10 conforms to the funnel-shaped front end of the measuring chamber 5. Further, a plurality of flow channels 11 are formed in the taper face and in a shaft front portion of the plunger, at predetermined radial intervals.

Reference numerals 12 and 13 designate a set of joint members for unitedly linking the heating cylinder 1 and the front end member 4, and reference numeral 14 designates a linking bolt.

In the illustrated embodiment, the entire shaft of the plunger 8 is formed to have the same diameter over the entire length of the shaft. However, in order to reduce a sliding resistance of the plunger 8 in the measuring chamber 5, a rear portion of the shaft may have a slightly smaller diameter than that of the front portion.

Reciprocation and rotational driving of the screw 7 and the plunger 8 are generated by a hydraulic or an electric driving machine, not shown, which is employed in injection apparatuses of ordinary structure.

According to the injection apparatus having the construction described above, the plunger 8 moves forward, together with the screw 7, through the distance of the injection stroke B, shown in FIG. 4, to thereby complete the injection step (see the state shown in FIG. 1). In this injection step, by the forward movement of the plunger 8 through the interior of the measuring chamber 5, the entire plasticated material which has been measured therein is injected and filled into a mold (not shown) except for a slight quantity thereof which is left in the measuring chamber to function as a cushion.

Figure 2:
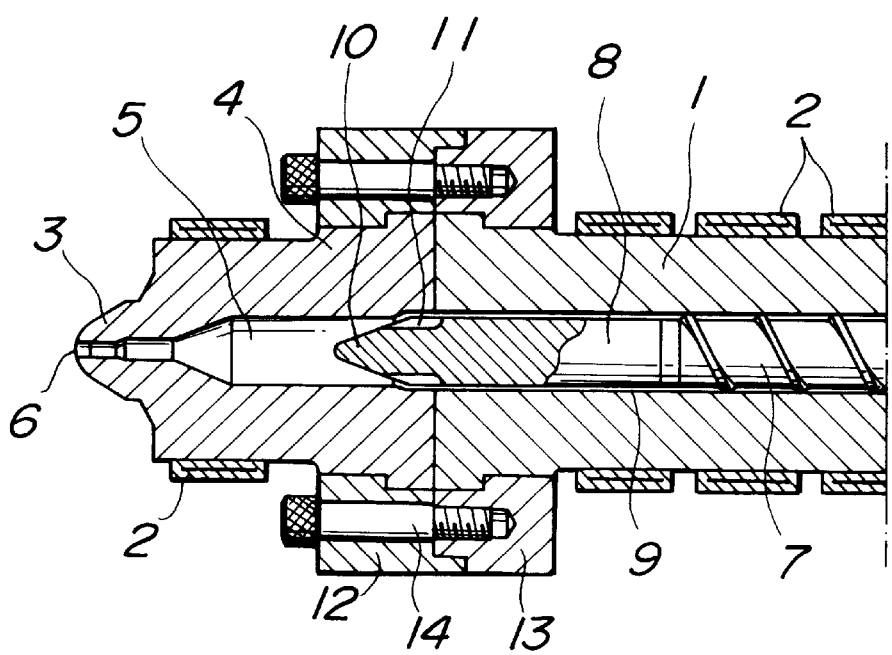
FIG. 2 is a fragmentary cross sectional view showing the construction of the essential part of the injection apparatus of FIG. 1, at the time of plastication.

When the injection step is completed, the plunger 8 moves backward, together with the screw 7, through the injection stroke B without rotation. At this backward movement, as shown in FIG. 2, the plunger 8 stops when the flow channels 11 in the front end 10 are positioned to a boundary between a front portion of the heating cylinder and the measuring chamber 5.

Next, the plunger 8 is rotated together with the screw 7 at this stoppage position as a plasticating position. Then, the molding material, such as a thermoplastic or a thermosetting resin material, or a metallic material, which has been supplied from a hopper, not shown, at a rear portion of the heating cylinder into the heating cylinder, is melted and kneaded by the rotation of the screw 7 under heating by the band heaters 2, whereby the material in a plasticated state flows and moves toward the front end of the heating cylinder.

The plasticated material which has flown from the screw 7 to the circumference of the plunger 8 is uniformly heated by the heating cylinder 1 during passage through the plastication-accelerating block A, whereby the material is further uniformly plasticated by the plastication-accelerating block A. Further, since the material is heated during its passage through the distance longer than the injection stroke B, uneven temperature in the material is eliminated.

The plasticated material in the plastication-accelerating block A is sequentially transferred from the flow channels 11 of the front end 10 of the plunger 8 to the measuring chamber 5, and stored in the same. However, the plasticated material stored in the chamber is prone to be uneven in density unlike a material plasticated under application of back pressure.

To cope with the inconvenience, upon completion of plastication of a predetermined quantity of the molding material by the rotation of the screw 7, the screw 7 is moved forward at a constant speed while nozzle touching to the mold is held, and the front end 10 of the plunger 8 is thrust into an opening of the measuring chamber 5. Then, the plasticated material in the measuring chamber is compressed due to the thrusting, and part of the material flows back from the flow channels 11 to the gap 9 surrounding the plunger. On the other hand, the plasticated material in the gap 9 flows back to the screw.

Figure 3:
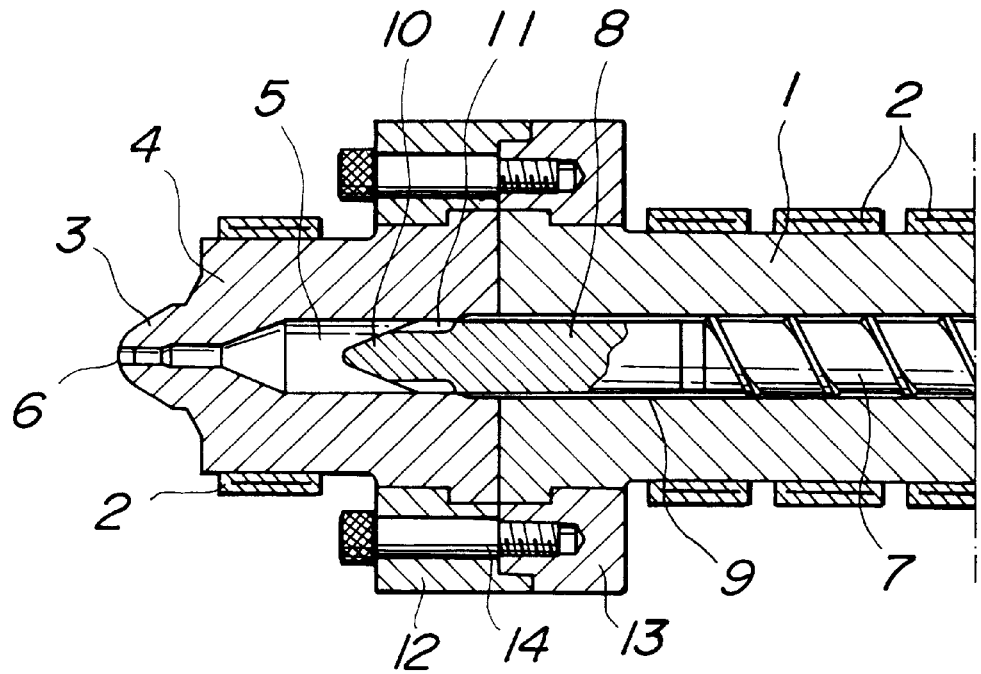
FIG. 3 is a fragmentary cross sectional view showing the construction of the essential part of the injection apparatus of FIG. 1, at the time of measuring and start of injection.

The compression of the plasticated material in the measuring chamber is carried out until the shaft front portion of the plunger 8 proceeds to a set position at which the opening of the measuring chamber 5 is completely closed by the shaft front portion of the plunger 8. During the thrusting, an excessive quantity of the plasticated material are removed and the resin present in the measuring chamber is compressed, whereby the density of the plasticated material in the measuring chamber is increased on the whole. Further, as shown in FIG. 3, when the measuring chamber 5 is closed by the shaft front part of the plunger 8, communication between the measuring chamber 5 and the gap 9 surrounding the plunger is interrupted, whereby the predetermined quantity of the plasticated material at a uniform density is stored in the measuring chamber 5. That is, precise measuring of the plasticated material is carried out.

After the measurement of the plasticated material, by sequentially moving forward the injection plunger 8 by means of the plasticating screw 7 until the front end 10 is positioned in the vicinity of the front end of the measuring chamber 5, the plasticated material in the measuring chamber 5 is injected from the nozzle port 6 into the mold except for a slight amount of the resin left in the front end of the measuring chamber as a cushion, as shown in FIG. 1.

The injection speed of the plasticated material is varied depending on the types of the molding materials. The present embodiment can cope with either a case where the injection speed is switched from low-speed advance to high-speed advance, or a case where the plunger keeps the low-speed advance even in the injection step.

At the time of the injection, although the plasticated material in plastication-accelerating block A flows back from the gap 9 to screw grooves of the screw 7, the occurrence of the back flow is only after the closure of the measuring chamber 5. Therefore, the back flow does not cause unstable measurement. Further, a portion of the plasticated material flowing back from the plastication-accelerating block A is first supplied to the measuring chamber 5 at the next plastication of the molding material. As a result, there is no fear of deterioration of the material due to overheating caused by retention thereof.

When the injection of the plasticated material is completed, the front end of the nozzle is separated from the mold, and the plunger 8 moves backward, together with the screw 7, to the plasticating position, as stated before. Then, plastication of the molding material caused by the rotation of the screw 7, heating of the plasticated material by the plastication-accelerating block A, and storage of the thus heated material to the measuring section 5 are carried out at this position. The plunger 8 may move backward while rotating together with the screw 7, if desired. In this case, plastication of the molding material is started at the start of the backward movement.

In the embodiment described above, the plasticated material flows in and out of the measuring chamber 5 by way of the flow channels 11, but it is also possible that the plasticated material may flow by way of a gap surrounding the conically-shaped plunger front end 10 as well. In this case, the flow channels 11 may be dispensed with, and by moving the position to which the plunger 8 is backed off to a position more backward than the position shown in FIG. 2, the surrounding gap is formed larger such that the plasticated material is easily flow into the measuring chamber 5.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. An injection apparatus comprising:

a heating cylinder having a front end and an internal diameter, said heating cylinder being provided with a heater surrounding the same;

a front end member having a nozzle and arranged at said front end of said heating cylinder, said front end member further having a measuring chamber formed therein at an internal central location thereof, said measuring chamber having a predetermined length and an internal diameter which is reduced by 8 to 15% with respect to said internal diameter of said heating cylinder;

a plasticating screw arranged in said heating cylinder in a freely rotating and reciprocating manner; and an injecting plunger connected to said screw in one body and having a conical front end, said plunger having a diameter almost equal to said internal diameter of said measuring chamber, thereby being insertable into said measuring chamber in a freely reciprocating manner, said injecting plunger being movable together with said plasticating screw from a plasticating position in said heating cylinder into said measuring chamber toward said nozzle over a distance of an injection stroke, wherein a gap between said internal diameter of said heating cylinder and said diameter of said plunger functions as a plastication-accelerating block around an external peripheral surface of said plunger, said plastication-accelerating block having a length longer than said injection stroke.

2. An injection apparatus as claimed in claim 1, wherein said plunger has a shaft front portion, said conical front end and said shaft front portion of said plunger having a plurality of flow channels formed therein.

* * * * *